(12) United States Patent
Fujita et al.

(10) Patent No.: US 6,686,087 B2
(45) Date of Patent: Feb. 3, 2004

(54) NON-AQUEOUS ELECTROLYTE SECONDARY CELL WITH A SPIRALLY WOUND ELECTRODE UNIT

(75) Inventors: Kazunori Fujita, Fukushima (JP); Masanori Anzai, Fukushima (JP)

(73) Assignee: Sony Corporation, Tokyo (JP)

( * ) Notice: Subject to any disclaimer, the term of this patent is extended or adjusted under 35 U.S.C. 154(b) by 153 days.

(21) Appl. No.: 09/888,183

(22) Filed: Jun. 22, 2001

(65) Prior Publication Data

US 2002/0090544 A1 Jul. 11, 2002

(30) Foreign Application Priority Data

Jun. 22, 2000 (JP) ...................... P2000-188496

(51) Int. Cl.$^7$ ................. H01M 6/02; H01M 10/02; H01M 10/04
(52) U.S. Cl. ........................ 429/94; 429/164
(58) Field of Search ............... 429/94, 163–164

(56) References Cited

U.S. PATENT DOCUMENTS 5,882,815 A * 3/1999 Tagawa ................ 429/94

FOREIGN PATENT DOCUMENTS

JP    11224693    * 8/1999    .......... H01M/10/40

* cited by examiner

Primary Examiner—Mark Ruthkosky
(74) Attorney, Agent, or Firm—Sonnenschein, Nath & Rosenthal LLP (57) ABSTRACT

A non-aqueous electrolyte secondary cell in which inner shorting may be prevented from occurring and which is improved in operational reliability and safety. The non-aqueous electrolyte secondary cell is comprised of an electrode unit loaded in a cell casing. The electrode unit is comprised at least of a strip-shaped cathode and a strip-shaped anode layered together and coiled longitudinally around a center pin. There is provided a pre-set clearance between the electrode unit and the cell casing so that (B+C)/2A, where A, B and C denote the inner diameter of the cell casing, the maximum outer diameter of the electrode unit and the minimum outer diameter of the electrode unit, respectively, is equal to or more than 0.954 and equal to or less than 0.988. The wound electrode unit has a degree of tightness to give a deformation of no more than 8%.

5 Claims, 4 Drawing Sheets

FIG.4

NON-AQUEOUS ELECTROLYTE SECONDARY CELL WITH A SPIRALLY WOUND ELECTRODE UNIT

RELATED APPLICATION DATA

The present application claims priority to Japanese Application No. P2000-188496 filed Jun. 22, 2000, which application is incorporated herein by reference to the extent permitted by law.

BACKGROUND OF THE INVENTION

1. Field of the Invention

This invention relates to a non-aqueous electrolyte secondary cell having a cathode, an anode and a non-aqueous electrolyte.

2. Description of Related Art

Among secondary cells, used as power source for portable electronic equipment, there are known a nickel-cadmium secondary cell, a nickel Metal-hydride secondary cell, a nickel zinc secondary cell and a lithium ion cell. Of these, the non-aqueous electrolyte secondary cell, employing a nickel-containing compound and a material capable of doping/undoping lithium as a cathode and an anode, respectively, or a so-called lithium ion cell, is of a high energy density and lightweight and hence is becoming a mainstream of a backup power source for e.g., a personal computer or a portable telephone set. Moreover, this non-aqueous electrolyte secondary cell is expected to be used as a secondary cell for a high performance electric car or a hybrid car.

This lithium ion cell is provided with a safety valve fitted with a mechanism for interrupting the current in case of an emergency, or with a PTC device, for the sake of safety in emergency. However, it is further desired to be improved in safety and operational reliability.

Also, a large number of lithium ion cells are assembled together as a set of unit cells for use as a secondary cell for the electric car or the hybrid car. For this reason, a higher operational reliability of a unit cell is needed for realization of the reliability as the cell seJun. 6, 2001t.

However, the conventional non-aqueous electrolyte secondary cell suffers a subject that the electrodes become expansion in charging to lead to internal shorting. For example, the electrodes tend to be expanded on initial charging to produce internal shorting to detract from operational reliability as a cell. Moreover, the electrodes are also expansion due to overcharging to occur an internal shorting, as a result of which heat is evolved within the cell to deterioration from operational safety as the cell.

SUMMARY OF THE INVENTION

It is therefore an object of the present invention to provide a non-aqueous electrolyte secondary cell progress in operational reliability and in safety.

The present invention provides a non-aqueous electrolyte secondary cell in which a spirally wound electrode unit comprised of a strip-shaped cathode and a strip-shaped anode layered together through a separator and coiled longitudinally together is sealed in a cell casing, wherein a pre-set clearance is provided between the electrode unit and the cell casing so that $(B+C)/2A$, where A is the inner diameter of the cell casing, B is the maximum outer diameter of the coiled electrode unit and C is the minimum outer diameter of the coiled electrode unit, is equal to or more than 0.954 and equal to or less than 0.988.

In the above-described non-aqueous electrolyte secondary cell of the present invention, in which a pre-set clearance is provided between the coiled electrode unit and the cell casing, there is no risk of the electrode unit contacting the cell casing even if the electrode unit becomes expanded due to the anode becoming expanded due to charging. Thus, with the non-aqueous electrolyte secondary cell, the inner shorting is prevented from occurring even if the coiled electrode unit becomes expansion such as due to initial charging or overcharging.

The electrode unit in the above-described non-aqueous electrolyte secondary cell has a center pin whereby minute inner shorting due to overcharging may be effectively prohibited to prevent heating to a high temperature in the cell from occurring.

That is, since the pre-set clearance is provided between the coiled electrode unit and the cell casing of the non-aqueous electrolyte secondary cell, the electrode unit may be prevented from contacting the cell casing even if the electrode is expanded due to the electrolytic solution or due to the anode becoming expanded through charging. Thus, the non-aqueous electrolyte secondary cell of the present invention is of high capacity and superior in cyclic characteristics, operational reliability and safety. In particular, the coiled electrode unit has a center pin, it is possible to prevent heat occurrence from being evolved in the cell to a high temperature due to overcharging to improve the operational safety of the non-aqueous electrolyte secondary cell having the coiled electrode unit.

DESCRIPTION OF THE PREFERRED EMBODIMENTS

Referring to the drawings, a non-aqueous electrolyte secondary cell according to the present invention will be explained in detail.

Figure 1:
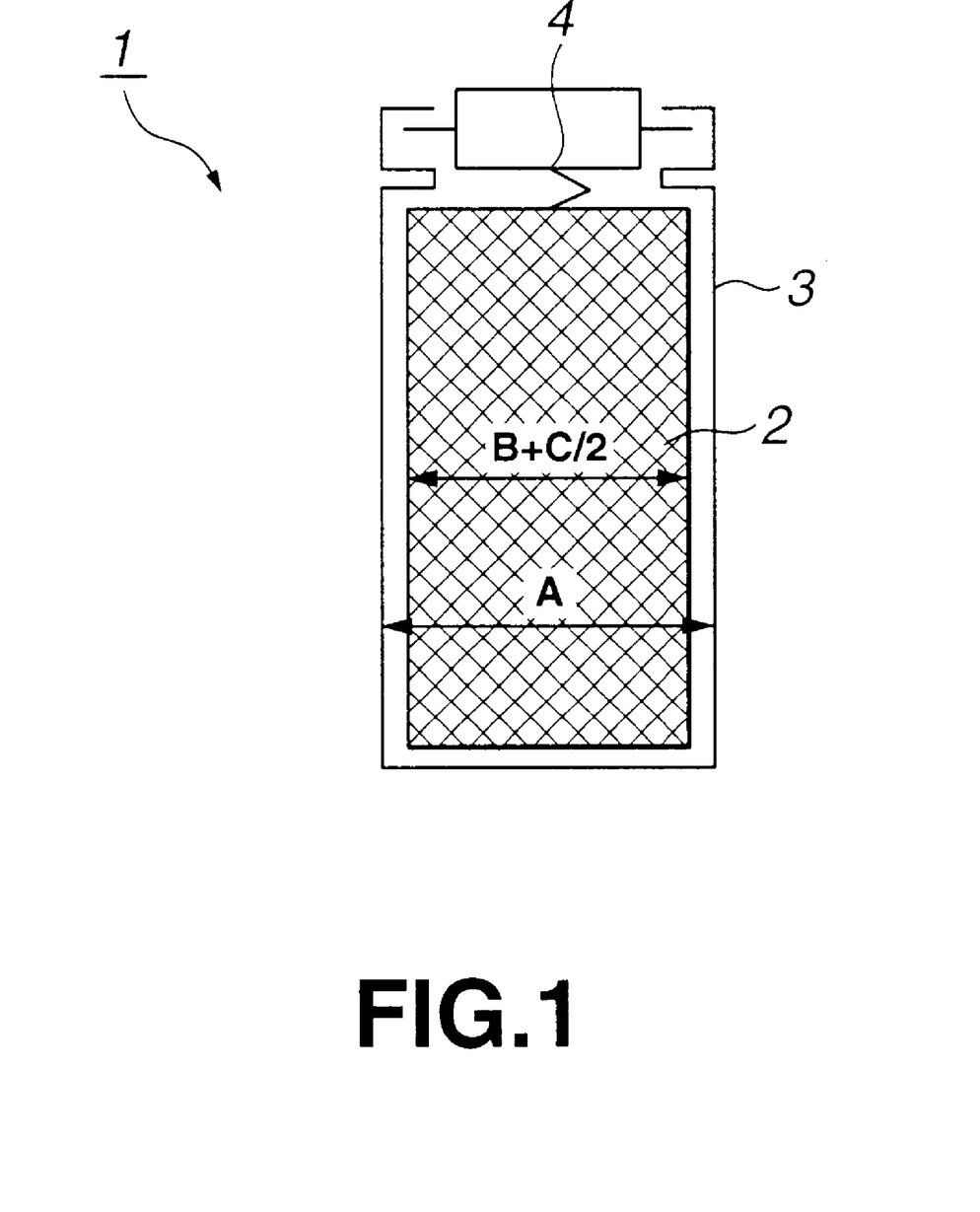
FIG. 1 is a schematic view of a non-aqueous electrolyte secondary cell according to the present invention.

Referring to FIG. 1, a non-aqueous electrolyte secondary cell 1 according to the present invention is a coiled electrode unit 2 enclosed in a cell casing 3 in which is also filled a non-aqueous electrolytic solution. The coiled electrode is made up of a strip-shaped cathode and a strip-shaped anode layered together through a separator and coiled together longitudinally.

It is noted that a pre-set clearance is formed between the electrode unit 2 and the cell casing 3 so that $(B+C)/2A$ is equal to or more than 0.954 and equal to or less than 0.988, where A, B and C denote the inner diameter of the cell casing 3, the maximum value of the outer diameter of the electrode unit 2 and the minimum value of the outer diameter of the electrode unit 2, respectively. This electrode unit 2 is enclosed in the cell casing 3.

Preferably, (B+C)/2A is equal to or more than 0.955 and equal to or less than 0.985. In particular, the non-aqueous electrolyte secondary cell is a large-sized one used as a power source for the electric car or the hybrid car, it is desirable for (B+C)/2A to meet this condition.

If, in case the pre-set clearance is not provided between the electrode unit 2 and the cell casing 3, that is in case (B+C)/2A exceeds 0.988, the electrode unit 2 is expanded due to the electrolytic solution or due to the anode becoming expanded due to initial charging, the cell casing 3 compresses against the expanded electrode unit 2, thus leading to stress concentration in the separator. The result is the internal shorting in the non-aqueous electrolyte secondary cell 1.

Moreover, if the electrode unit 2 is expanded due to overcharging, the cell casing 3 compresses against the electrode unit 2, thus leading to minute internal shorting in the electrode 2. If overcharging is continued in this state, significant heating occurs in the cell due to the internal shorting.

On the other hand, if, in case an excess clearance is provided between the electrode unit 2 and the cell casing 3, that is in case (B+C)/2A is smaller than 0.954, the reaction area of the electrode unit 2 is small, such that the desired cell capacity is not achieved.

The cathode is comprised of a cathode current collector on which a cathode mixture, containing a cathode active material and a binder, is coated and dried.

As the cathode active material, a lithium-containing compound, for example, is used. Among the lithium-containing compounds, there are lithium transition metal composite oxides, represented by $LiMO_2$, where M denotes one or more transition metals. Specifically, $LiCoO_3$, $LiNiO_2$ and $LiMn_2O_4$, for example, are preferred. These lithium transition metal composite oxides may be prepared by mixing carbonates, nitrates, oxides and hydroxides of lithium, cobalt, nickel and manganese, as starting materials, in respective amounts related to the composition, and firing the resulting mixture at a temperature range of from 600° to 1000° C.

As the cathode current collector metal foils, such as aluminum foils, for example, may be used.

As the binder, any suitable known binder routinely used in the cathode mixture compound of this sort of the cell may be used. To the cathode mixture, known additives, such as conductive agents, may be added as necessary.

The anode is comprised of an anode current collector on which an anode mixture compound containing an anode active material and a binder are coated and dried.

As the anode active material, such a material that is able to dope/de-dope lithium, such as a carbon material, may be used. As the carbon material, a low crystalline carbon material obtained on sintering at a lower temperature of 2000° C. or lower, or a high crystalline carbon material obtained on processing at a higher temperature close to 3000° C., such as artificial graphite or natural graphite, may be used. Specifically, pyrocarbons, cokes, graphites, vitreous carbons, sintered organic high molecular compounds, that is furane resins or the like carbonated on sintering at suitable temperatures, carbon fibers and activated charcoal, may be used.

As the anode current collector, making up the anode, metal foils, such as copper foils, may be used.

As the binder for the anode mixture, any suitable known binder routinely used in the anode mixture of this sort of the cell may be used. To the anode mixture, known additives, such as conductive agents, may be added as necessary.

The electrode unit 2 is of a spiral structure comprised of the strip-shaped cathode and anode, obtained as described above, layered together with the interposition of a separator of a micro-porous polyolefine film and coiled a number of turns along the longitudinal direction.

The electrode unit 2 is preferably provided with a center pin which may be any of known types of center pins routinely used for this sort of the non-aqueous electrolyte secondary cell.

The center pin is inserted into a center void opening in the electrode unit 2 to apply the force of distortion to the void opening to prevent internal shorting from occurring even if the electrode is expanded due to overcharging into contact with the cell casing 3 to produce distortion. By inserting the center pin into the center void opening of the electrode unit 2, the electrode unit 2 may be oriented so as to be expanded outwards.

Thus, with the non-aqueous electrolyte secondary cell 1, enclosed with the electrode unit 2 having the center pin, it is possible to prevent the minute inner shorting from occurring due to overcharging to prevent enormous heat occurrence from being evolved in the cell.

The winding of electrode 2 is preferably of such tightness that the amount of deformation is not larger than 8%. The amount of deformation is the change caused to the volume of the spirally coiled electrode unit 2 by clamping the spirally coiled electrode 2 within two flat plates and applying a load directly proportional to the cathode width, i.e. 1 kgf per each cm of cathode width, wherein the load is applied in the direction of the winding axis of the electrode assembly. The cathode width is defined as the length of the cathode strip along the winding axis of the electrode assembly.

For preventing the inner shorting by the expanded electrode, there is a technique of loosely coiling a strip-shaped electrode to produce the spirally wound electrode unit 2. If the loosely spirally wound electrode unit 2, that is the electrode unit with the amount of deformation larger than 8%, is loaded on the non-aqueous electrolyte secondary cell 1, the cyclic characteristics tend to be lowered. Therefore, by setting the amount of deformation of the electrode 2 to 8% or less, the non-aqueous electrolyte secondary cell 1 is superior in cyclic characteristics and is of high capacity.

The non-aqueous electrolyte is the electrolyte salt dissolved in an organic solvent.

Although there is no particular limitation to the organic solvent, cyclic carbonates, such as ethylene carbonate or propylene carbonate, chained carbonates, such as dimethyl carbonate or diethyl carbonate, methyl-ethyl carbonate, cyclic esters, such as γ-butyrolactone and γ-valerolactone, chained esters, such as ethyl acetate or methyl propionate, and ethers, such as tetrahydrofurane or 1,2-dimethoxyethane, may be used. These organic solvents may be used singly or as a mixture.

There is no limitation to the electrolyte salt provided that it is a lithium salt exhibiting ion conductivity when dissolved in an organic solvent. For example, $LiPF_6$, $LiBF_4$, $LiClO_4$, $LiCF_3SO_3$, $LiN(CF_3SO_2)_2$, $Lic(CF_3SO_2)_3$, may be used. These electrolytes may be used singly or as a mixture.

For preparing the non-aqueous electrolyte secondary cell 1, the strip-shaped cathode and anode, obtained as described above, are stacked together, with the interposition of a separator formed by, for example, a micro-porous polypropylene film, and are coiled a number of turns along the longitudinal direction to form a spirally wound electrode unit 2, which then is housed in the cell casing 3. The center pin is inserted at the center of the electrode 2. On the upper and lower surfaces of the electrode 2 are placed insulating plates, not shown.

For collecting the current from the cathode of the spirally wound electrode unit 2, one end of a cathode lead is attached to the cathode, with the other end of the cathode lead being electrically connected to a cell lid. This electrically connects the cell lid to the cathode so that the cell lid operates as an external cathode of the non-aqueous electrolyte disc 1. For collecting the current from the anode of the spirally wound electrode unit 2, one end of an anode lead is attached to the anode, with the other end of the anode lead being electrically connected to the cell casing 3. This electrically connects the cell casing 3 to the anode so that the cell can operate as an external anode of the non-aqueous electrolyte disc 1.

The non-aqueous electrolyte then is poured into the cell casing 3, which then is caulked through an insulating sealing gasket coated with asphalt to secure the cell lid to complete the cylindrically-shaped non-aqueous electrolyte secondary cell 1.

Meanwhile, the non-aqueous electrolyte secondary cell 1 is provided with a safety valve 4 for degassing the inside of the cell when the pressure in the cell exceeds a pre-set value.

In the above-described non-aqueous electrolyte secondary cell 1, the pre-set clearance is provided between the electrode 2 and the cell casing 3, so that, if the inner diameter of the cell casing 3 is A, the maximum outer diameter of the electrode unit 2 is B and the minimum outer diameter of the electrode unit 2 is C, (B+C)/2A will be equal to or more than 0.954 and equal to or less than 0.988. Accordingly, the electrode unit 2 is not contacted with the cell casing 3 even if the electrode unit 2 is expanded on charging. Thus, there is no risk of the internal shorting of the non-aqueous electrolyte secondary cell 1 even in case of initial charging or overcharging, so that the cell is of progress operational reliability and safety.

In particular, since the electrode unit 2 has a center pin so that the non-aqueous electrolyte secondary cell 1 is safeguarded against the risk of occurrence of minute inner shorting due to overcharging and against high beat evolution within the cell and hence the cell is of extremely high safety.

Since the pre-set clearance is provided between the electrode unit 2 and the cell casing 3, the space within the non-aqueous electrolyte secondary cell is increased, so that the electrolytic solution can be charged extremely readily to improve productivity. If, in particular, the non-aqueous electrolyte secondary cell 1 is of a small size, the possibility of occurrence of the shutting off of a current interrupting valve on storage under elevated temperature is extremely low.

Moreover, since the pre-set clearance is provided between the electrode unit 2 and the cell casing 3, degassing is improved in an extreme safety test involving gas injection, with the result that the non-aqueous electrolyte secondary cell 1 is improved in safety and in operational reliability.

Figure 2:
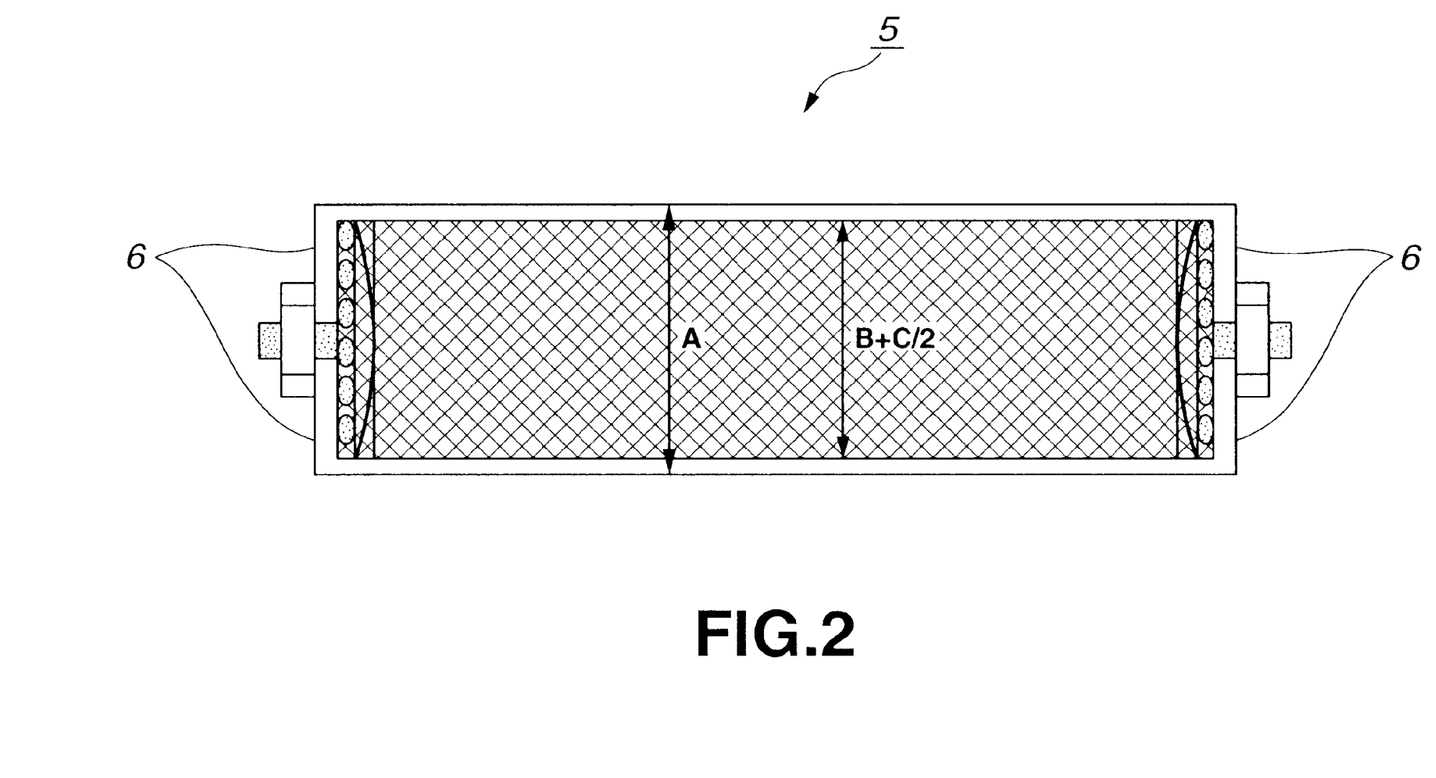
FIG. 2 is a schematic view showing a large-sized non-aqueous electrolyte secondary cell according to the present invention.

Meanwhile, the non-aqueous electrolyte secondary cell 1 may not only be small but large in size. The large-sized non-aqueous electrolyte secondary cell 5 is provided with plural safety valves 6, as shown in FIG. 2. The electrolyte may be a gel electrolyte, a solid electrolyte or other sorts of non-aqueous electrolytes, without being limited to the liquid type electrolyte, which is the so-called non-aqueous electrolyte.

EXAMPLES

The present invention is now explained with reference to several specified Examples based on experimental results.

Experiment 1

First, a large-sized cylindrically-shaped non-aqueous electrolyte secondary cell was prepared and the relation between the occurrence of inner shorting due to initial charging and the clearance was investigated.

Sample 1

A cathode was prepared as follows: First, 91 parts by weight of $LiCoO_2$ as a cathode active material, 6 parts by weight of graphite powders, as conductive agent, and 3 parts by weight of polyvinylidene fluoride, as a binder, were mixed together to prepare a cathode mixture, which then was dispersed in N-methyl-2-pyrrolidone to prepare a cathode mixture slurry. This slurry then was uniformly coated on a strip-shaped aluminum foil, operating as a cathode current collector, and dried. The aluminum foil was 20 μm in thickness. The resulting product was compression-molded by a roll press and cut to a width of 342 mm and a length of 5400 mm to form a strip-shaped cathode.

The anode was prepared as follows: First, 90 parts by weight of the anode active material and 10 parts by weight of polyvinylidene fluoride as a binder were mixed together to form an anode. As the anode active material, a carbon material, sintered in an inert gas atmosphere and pulverized to a mean particle size of 20 μm, was used. This anode mixture then was dispersed in N-methyl-2-pyrrolidone to form an anode mixture slurry. This slurry then was uniformly coated on a strip-shaped copper foil operating as an anode current collector, and dried. The copper foil was 15 μm in thickness. The resulting product was compression-molded by a roll press and cut to a width of 348 mm and a length of 5600 mm to form a strip-shaped anode.

The strip-shaped cathode and anode, prepared as described above, were stacked together, with the interposition of a micro-porous polyethylene film, 80 μm thick, as a separator, and coiled a number of turns to form a spirally wound electrode unit. It is noted that the amount of deformation of the spirally wound electrode unit, sandwiched between two planar plates, and pressured to 34.2 kg, was 5%.

The current collectors of the cathode and anode were welded to the cathode lead and to the anode lead for current collection using a laser beam. The resulting electrode was housed with a pre-set clearance in a cylindrically-shaped cell casing having an inner diameter of 65.9 mm.

This pre-set clearance is prescribed by (B+C)/2A, where A, B and C are the inner diameter of the cell casing, maximum outer diameter of the electrode and the minimum outer diameter of the electrode, respectively. With the non-aqueous electrolyte secondary cell of the sample 1, since (B+C)/2 is 64.9 mm an A is 65.9 mm, (B+C)/2A is 0.985.

A cell lid fitted with a safety valve, insulating packing and a ceramic spacer were assembled in position and the cell lid and the cell casing were welded together using a laser beam. The electrolytic solution then was poured through an opening for injection of the electrolytic solution and the opening then was hermetically sealed with a bolt to produce a cylindrically-shaped non-aqueous electrolyte secondary cell. The electrolytic solution used was prepared by dissolving $LiBF_4$ in a 1:1 solution of propylene carbonate and dimethyl carbonate at a concentration of 1 mol/lit.

Sample 2

A non-aqueous electrolyte secondary cell was prepared in the same way as in sample 1 except preparing a spirally wound electrode unit so that the cathode length is 5240 mm, the anode length is 5440 mm and (B+C)/2 is 64.0 mm, with the amount of deformation being 5%.

Sample 3

A non-aqueous electrolyte secondary cell was prepared in the same way as in sample 1 except preparing a spirally wound electrode unit so that the cathode length is 5060 mm, the anode length is 5260 mm and (B+C)/2 is 63.0 mm, with the amount of deformation being 5%.

Sample 4

A non-aqueous electrolyte secondary cell was prepared in the same way as in sample 1 except preparing a spirally wound electrode unit so that the cathode length is 5060 mm, the anode length is 5260 mm and (B+C)/2 is 63.0 mm, with the amount of deformation being 8%.

Sample 5

A non-aqueous electrolyte secondary cell was prepared in the same way as in sample 1 except preparing a spirally wound electrode unit so that the cathode length is 5060 mm, the anode length is 5260 mm and (B+C)/2 is 63.1 mm, with the amount of deformation being 12%.

Sample 6

A non-aqueous electrolyte secondary cell was prepared in the same way as in sample 1 except preparing a spirally wound electrode unit so that the cathode length is 5510 mm, the anode length is 5710 mm and (B+C)/2 is 65.5 mm, with the amount of deformation being 5%.

Sample 7

A non-aqueous electrolyte secondary cell was prepared in the same way as in sample 1 except preparing a spirally wound electrode unit so that the cathode length is 4710 mm, the anode length is 4910 mm and (B=C)/2 is 61.0 mm, with the amount of deformation being 5%.

Of the samples 1 to 7, prepared as described above, the rate of occurrence of shorting and the cell capacity were measured. The evaluation method for these samples is now explained.

Ratio of Occurrence of Inner Shorting

First, the initial charging for each cell was carried out with the charging voltage being set to an upper limit value of 4.2 V. The cells were allowed to stand at 25° C. and checked as to possible occurrence of inner shorting from voltage changes after allowing to stand for three weeks. When the voltage decrease of a given cell was larger by not less than 20 m V than the mean voltage drop, the cell was determined to suffer from inner shorting.

After verifying the inner shorting, constant current constant voltage charging was carried out up to an upper limit of 4.15 V, with the constant current being set to 90 A. The cell capacity then was measured by constant current discharging of 30 A up to the terminal voltage of 2.50V. Meanwhile, as the cell capacity, a mean value of ten cells being measured was used.

The value of (B+C)/2A of each cell and the amount of deformation of each spirally wound electrode unit are shown in Table 1:

TABLE 1

| | (B + C)2A | rate of occurrence of inner shorting | cell capacity (Ah) | amount of deformation (%) |
|---|---|---|---|---|
| sample 1 | 0.985 | 0/100 | 92 | 5 |
| sample 2 | 0.971 | 0/100 | 89.3 | 5 |
| sample 3 | 0.956 | 0/100 | 86.2 | 5 |
| sample 4 | 0.956 | 0/100 | 86.2 | 8 |
| sample 5 | 0.958 | 0/100 | 86.2 | 12 |
| sample 6 | 0.944 | 2/100 | 93.9 | 5 |
| sample 7 | 0.926 | 0/100 | 80.2 | 5 |

As may be seen from Table 1, the samples 1 to 5, in which a pre-set clearance is provided between the electrode unit and the cell casing so that (B+C)/2A is equal to or more than 0.954 and equal to or less than 0.988, the occurrence of the inner shorting is prevented from occurring.

Conversely, with the sample 6 in which (B+C)/2A exceeds 0.988, the electrode unit is expanded on charging into contact with the cell casing to cause inner shorting. Moreover, with the sample 7 in which (B+C)/2A is less than 0.954, it was found that, although these is no occurrence of the inner shorting, the cell capacity is as low as only 80.9 Ah, because the reaction area of the electrode unit is small.

It was seen from this that, by setting (B+C)/2A so as to be equal to or more than 0.954 and equal to or less than 0.988, the occurrence of the inner shorting may be prevented from occurring so that a non-aqueous electrolyte secondary cell with the desired cell capacity could be achieved.

Of the samples 3 to 5, the cyclic characteristics were measured as follows:

Cyclic Characteristics

The second charging and the following chargings were carried out for the samples 3 to 5 at the constant current of 90 A and with the upper limit of the charging voltage of 4.15V. The discharging at the constant current of 90 A was then carried out up to the terminal voltage of 2.50V. This charging/discharging was repeated to measure the discharging capacity of each cycle. The discharging efficiency (%) with the initial discharging capacity of 100 was found and evaluated as cyclic characteristics.

Figure 3:
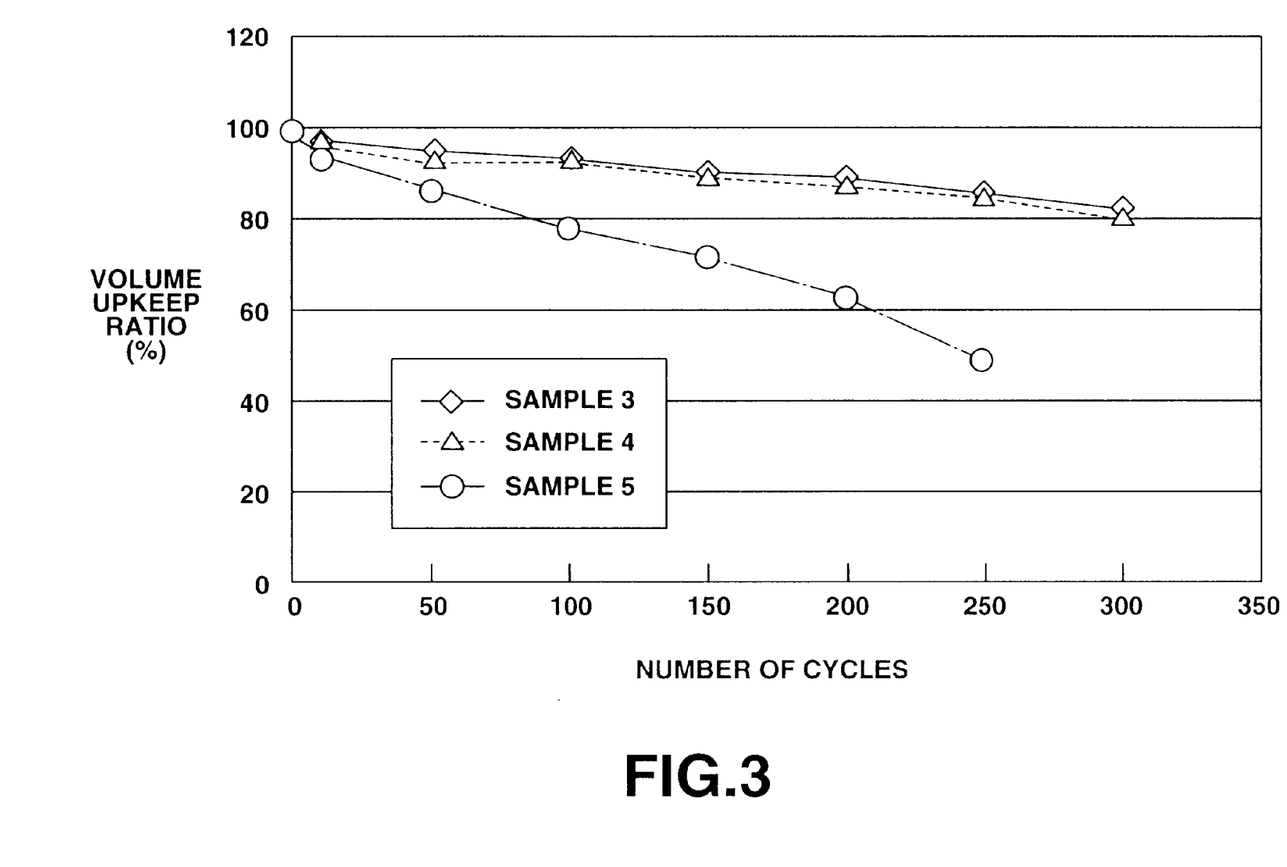
FIG. 3 is a graph showing cyclic characteristics of cells prepared as samples 3 to 5.

The results of the above-mentioned cyclic characteristics are shown in FIG. 3, from which it is seen that the samples 3 and 4, with the amount of deformation not larger than 8%, has cyclic characteristics better than those of the sample 5 with the amount of deformation of 12%. It was seen from this that the amount of deformation of the spirally wound electrode unit of not higher than 8% is desirable.

Experiment 2

A small-sized cylindrically-shaped non-aqueous electrolyte secondary cell was prepared and checked for the relation between the clearance and the temperature of heating occurring in the cell as a result of overcharging.

Sample 8

The cathode was prepared as follows: First, 86 wt % of $LiCoO_2$, as a cathode active material, 6 wt % of graphite, as an conductive agent and 4 wt % of polyvinylidene fluoride, as a binder, were mixed together to prepare a cathode mixture. This cathode mixture was then dispersed in N-methyl-2-pyrrolidone to form a cathode mixture slurry, which then was coated evenly on a strip-shaped aluminum foil, 20 μm thick, as a cathode current collector, and dried. The resulting product was compression molded in a roll press and sliced to form plural strip-shaped cathodes.

The anode was prepared as follows: First, 90 wt % of graphite powders, as an anode active material, and 10 wt % of polyvinylidene fluoride, were mixed together to prepare an anode mixture. This anode mixture was then dispersed in N-methyl-2-pyrrolidone to form an anode mixture slurry, which then was coated evenly on a strip-shaped copper foil, 10 μm thick, as an anode current collector, and dried in situ. The resulting product was compression molded in a roll press and sliced to form plural strip-shaped anodes.

Figure 4:
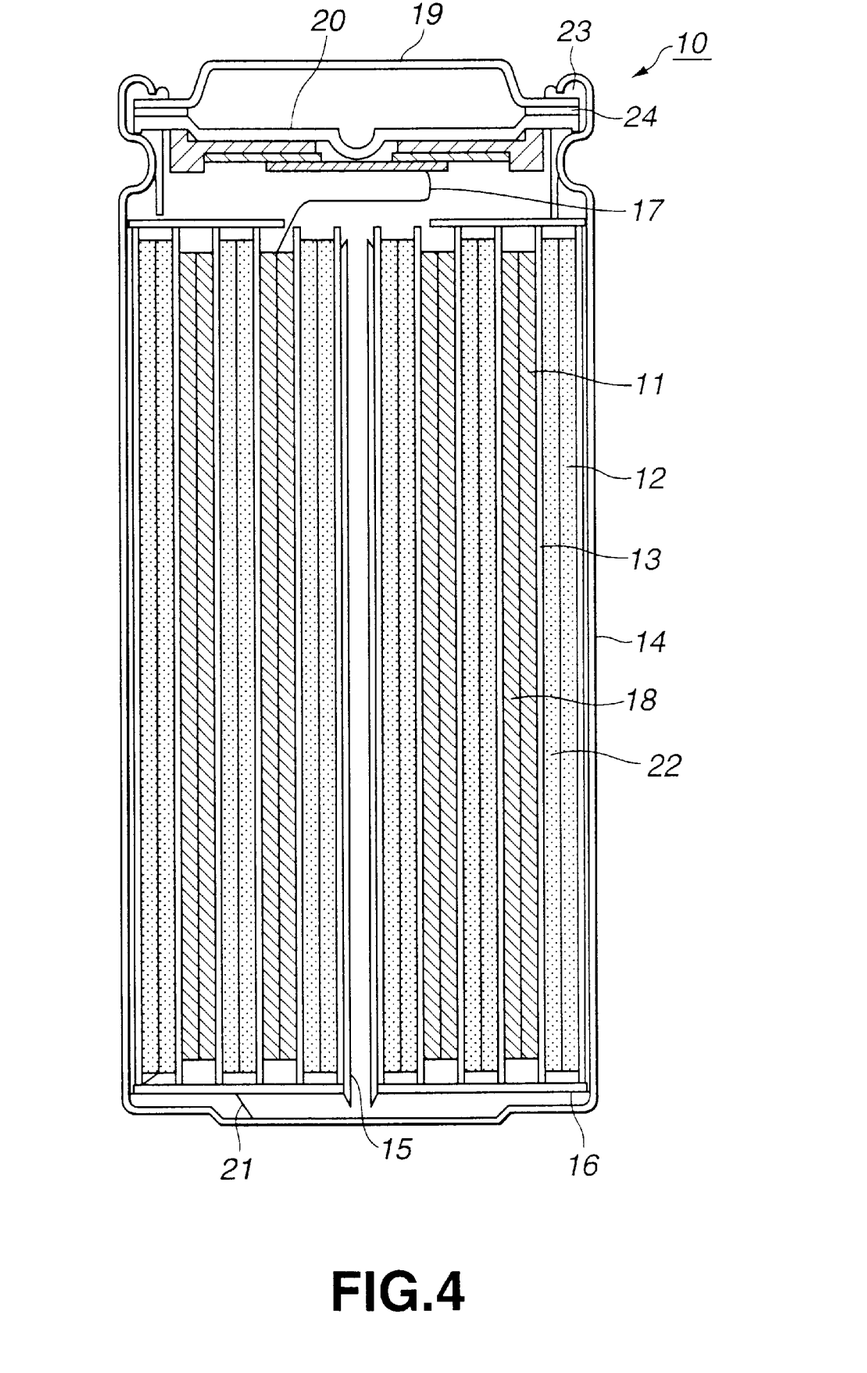
FIG. 4 is a cross-sectional view showing a small-sized cylindrically-shaped non-aqueous electrolyte secondary cell according to the present invention.

As an electrode unit to be fitted on a small-sized cylindrically-shaped non-aqueous electrolyte secondary cell 10, a strip-shaped cathode 11 and a strip-shaped anode 12, prepared as described above, were stacked together, with the interposition of a micro-porous polyethylene film, 25 μm thick, as a separator 13, and coiled a number of turns to form a spirally wound electrode unit, as shown in FIG. 4.

The electrode unit then was housed with a pre-set clearance in a nickel-plated iron cell casing 14, having an inner diameter of 17.35 mm, and a center pin 15 was inserted into the center of the electrode unit. An insulating plate 16 was mounted on the upper and lower sides of the electrode unit. The magnitude of (B+C)/2A, as a measure of the clearance ratio, was set to 0.9695.

A cathode lead 17 of aluminum was derived from the cathode current collector 18 and welded to a safety valve unit 20. An anode lead 21 of nickel was also derived from the anode current collector 22 and welded to the cell casing 14.

An electrolytic solution then was poured into the cell casing 14. The electrolytic solution used was prepared on mixing ethylene carbonate and methyl ethyl carbonate at a ratio of 1:1 to prepare a solution and dissolving $LiPF_6$ as an electrolyte salt at a ratio of 1 mol/lit therein.

The safety valve unit 20, having a safety valve for caulking the opening of the cell casing 14 and a current interrupting unit, a PTC device 24 and the terminal plate 19 were secured together, through a sealing gasket 23, having its surface coated with asphalt, to prepare a cylindrically-shaped non-aqueous electrolyte secondary cell having a diameter of 18 mm and a height of 65 mm.

Samples 9 to 12

Non-aqueous electrolyte secondary cells were prepared in the same way as in sample 8 except setting the magnitude (B+C)/2A as shown in Table 2 below.

Sample 13

A non-aqueous electrolyte secondary cell was prepared in the same way as in sample 10 except not providing a center pin on the electrode unit.

Of the samples 8 to 12, prepared as described above, the cell capacity was measured. Of the samples 8 to 13, prepared as described above, the overcharging test was carried out to measure the maximum temperature of the heating then produced in the cell. The measurement method used is as follows:

Cell Capacity

With the charging voltage of 4.20 V and the charging current of 1000 mA, charging for 10 hours was carried out at 23° C. for ten hours and constant current discharging at 1000 mA was carried out up to the terminal voltage of 2.5V to measure the cell capacity. Meanwhile, the cell capacity as a mean value of cells I to V as tested.

Overcharging Test

After measuring the cell capacity, the overcharging test at the charging voltage of 20 V and the charging current of 1700 mA was carried out on the test cells I to V. The maximum temperature of the heating generated in the cell was measured by directly bonding a thermocouple to the surface of the cell can.

The measured results on the samples 8 to 13, the possible presence of the center pin and the magnitudes of (B+C)/2A for the cells are also shown in Table 2.

TABLE 2

|  | (B + C)/2A | presence of center pin | cell capacity (mAh) | max. heating temperature due to overcharging (° C.) | | | | |
|---|---|---|---|---|---|---|---|---|
|  |  |  |  | cell I | cell II | cell III | cell IV | cell V |
| sample 8 | 0.9695 | present | 1650 | 65 | 67 | 69 | 66 | 68 |
| sample 9 | 0.988 | present | 1690 | 68 | 65 | 67 | 69 | 66 |
| sample 10 | 0.954 | present | 1600 | 66 | 64 | 64 | 69 | 67 |
| sample 11 | 0.930 | present | 1570 | 68 | 64 | 65 | 65 | 67 |
| sample 12 | 0.990 | present | 1700 | 104 | 101 | 105 | 100 | 102 |
| sample 13 | 0.954 | not present | — | 101 | 104 | 105 | 105 | 107 |

It is seen from Table 2 that, with the samples 8 to 10 in which the pre-set clearance is provided between the electrode set and the cell casing so that (B+C)/2A will be equal to or more than 0.954 and equal to or less than 0.988, and the electrode unit is provided with the center pin, heat evolution due to inner heating is prevented even in case of overcharging.

Conversely, with the sample 11 with (B+C)/2A less than 0.954, the cell capacity is low due to the small reaction area of the electrode unit, even though the heat evolution due to inner shorting is prevented from occurring. On the other hand, with the sample 12 with (B+C)/2A exceeding 0.988, the electrode becomes expanded into contact with the cell casing, due to overcharging, and moreover is expanded to cause inner shorting, thus leading to high heat evolution.

With the sample 13, in which (B+C)/2A is within a pre-set range but in which the electrode unit is not provided with the center pin, heat is evolved in the cell due to overcharging.

Thus, it is seen that a non-aqueous electrolyte secondary cell in which (B+C)/2A is equal to or more than 0.954 and equal to or less than 0.988, with the electrode unit being provided with a center pin, the inner shorting may be prevented from occurring even in case of overcharging, there being no risk of high heat being evolved in the cell, with the cell capacity being of a desired value.

Sample 14

A non-aqueous electrolyte secondary cell was prepared in the same way as in sample 12 except preparing a cylindrically-shaped cell with the diameter and the height of 26 mm and 65 mm, respectively, with the inner diameter of the cell casing being 25.4 mm.

Sample 15

A non-aqueous electrolyte secondary cell was prepared in the same way as in sample 12 except preparing a cylindrically-shaped cell with the diameter and the height of 14 mm and 43 mm, respectively, with the inner diameter of the cell casing being 13.3 mm.

Sample 16

A non-aqueous electrolyte secondary cell was prepared in the same way as in sample 9 except preparing a cylindrically-shaped cell with the diameter and the height of 26 mm and 65 mm, respectively, with the inner diameter of the cell casing being 25.4 mm.

Sample 17

A non-aqueous electrolyte secondary cell was prepared in the same way as in sample 9 except preparing a cylindrically-shaped cell with the diameter and the height of 14 mm and 43 mm, respectively, with the inner diameter of the cell casing being 13.3 mm.

On the samples 14 to 17, prepared as described above, the aforementioned overcharging test was conducted in similar manner and the maximum temperature of the heat evolved in the cell was measured. The above test results and (B+C)/2A values of the respective cells are shown collectively in Table 3.

TABLE 3

|  | (B + C)/2A | cell size | max. temperature of heat evolved due to overcharging (° C.) | | | | |
|---|---|---|---|---|---|---|---|
|  |  |  | cell I | cell II | cell III | cell IV | cell V |
| sample 14 | 0.990 | φ26 mm × 65 mm | 101 | 103 | 102 | 100 | 101 |
| sample 15 | 0.990 | φ14 mm × 43 mm | 104 | 105 | 104 | 103 | 100 |
| sample 16 | 0.988 | φ26 mm × 65 mm | 66 | 68 | 67 | 68 | 66 |
| sample 17 | 0.988 | φ14 mm × 43 mm | 67 | 64 | 66 | 68 | 67 |

It is seen that, with the samples 16 and 17, with different cell sizes, in which a pre-set clearance is provided between the electrode unit and the cell casing so that (B+C)/2A will be not less than 0.954 and not larger than 0.988, and the electrode unit is provided with the center pin, heat evolution is prevented from occurring even if the electrode unit becomes expanded due to overcharging, and that thus the present invention is applicable to various sizes of the non-aqueous electrolyte secondary cells.

What is claimed is:

1. A non-aqueous electrolyte secondary cell with a spirally wound electrode unit, comprising:
   a) a cell casing;
   b) a center pin; and
   c) a strip-shaped cathode layer, a strip-shaped anode layer and a separator layer between the cathode layer and the anode layer, wherein,
    the layers are spirally wound around the center pin and an axis parallel to their width, and enclosed in the cell casing,
    a pre-set clearance is provided between the spirally wound electrode unit and the cell casing, such that (B+C)2A is at least 0.954 and at most 0.988, A being the inner diameter of the cell casing, B being the maximum outer diameter of the electrode unit and C being the minimum outer diameter of the electrode unit, and
    the amount of deformation caused by clamping the spirally coiled electrode within two flat plates and applying a load directly proportional to the cathode width of 1 kgf per each cm of cathode width, wherein the load is applied in the direction of the winding axis of the electrode unit, is at most 8%.

2. A non-aqueous electrolyte secondary cell according to claim 1, wherein said electrode is a strip-shaped electrode comprised of a current collector in the form of a strip-shaped metal foil on both sides of which are formed layers of a mixture of an active material.

3. A non-aqueous electrolyte secondary cell according to claim 1, wherein (B+C)/2A is at least 0.955 and at most 0.985.

4. A non-aqueous electrolyte secondary cell according to claim 1, wherein said cathode is an electrode in the form of a strip-shaped metal foil formed of one or more lithium transition metal composite oxides $LiMO_2$, wherein M is a transition metal, and the anode active material is a carbon material capable of doping/de-doping lithium.

5. A non-aqueous electrolyte secondary cell according to claim 1, wherein said cathode comprises $LiCoO_2$ or $LiNiO_2$ and wherein the anode contains a graphite-based active material.

* * * * *